US006737450B2

(12) United States Patent
Batlaw

(10) Patent No.: US 6,737,450 B2
(45) Date of Patent: May 18, 2004

(54) TONER COMPOSITIONS FOR BLACK GRAVURE INKS

(75) Inventor: Rajnish Batlaw, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 273 days.

(21) Appl. No.: 10/001,347

(22) Filed: Oct. 26, 2001

(65) Prior Publication Data

US 2003/0082349 A1 May 1, 2003

(51) Int. Cl.[7] .................................................. C09D 11/10
(52) U.S. Cl. ..................... 523/160; 106/31.27; 106/31.6
(58) Field of Search ................................. 523/160, 161; 106/31.27, 31.28, 31.6

(56) References Cited

U.S. PATENT DOCUMENTS

| | | | | |
|---|---|---|---|---|
| 4,284,729 A | * | 8/1981 | Cross et al. | 521/158 |
| 4,812,141 A | * | 3/1989 | Baumgartner et al. | 8/506 |
| 5,194,463 A | * | 3/1993 | Krutak et al. | 524/35 |
| 5,637,638 A | | 6/1997 | Chandler et al. | 524/591 |
| 5,782,966 A | | 7/1998 | Bui et al. | 106/31.43 |
| 5,886,091 A | * | 3/1999 | Harris et al. | 524/590 |
| 5,955,523 A | * | 9/1999 | Stephens et al. | 524/167 |
| 6,255,432 B1 | | 7/2001 | Evans et al. | 528/49 |
| 6,299,941 B1 | * | 10/2001 | Sacripante et al. | 427/288 |
| 6,369,128 B1 | * | 4/2002 | Hunt et al. | 523/161 |
| 6,610,131 B2 | * | 8/2003 | Harris et al. | 106/31.27 |

FOREIGN PATENT DOCUMENTS

EP 0/769509 10/1996

* cited by examiner

Primary Examiner—Callie Shosho
(74) Attorney, Agent, or Firm—Terry T. Moyer; Thomas L. Moses

(57) ABSTRACT

A novel, easy, and efficient manner of toning shades of toluene-based gravure inks is provided, particularly through the incorporation of certain polymeric colorannts therein said gravure ink formulations. In addition, such toner additives provide a toning capabilities of carbon black-based gravure inks that provides jetter black appearances with lower degrees of redness and bronzing on various types of printing substrates than other toner formulations of standards alkali blue types of toning additives. Such printed substrates and methods of printing utilizing such novel gravure toner additives are also encompassed within this invention.

8 Claims, No Drawings

TONER COMPOSITIONS FOR BLACK GRAVURE INKS

FIELD OF THE INVENTION

A novel, easy, and efficient manner of toning shades of toluene-based gravure inks is provided, particularly through the incorporation of certain polymeric colorannts therein said gravure ink formulations. In addition, such toner additives provide toning capabilities of carbon black-based gravure inks that provides jetter black appearances with lower degrees of redness and bronzing on various types of printing substrates than other toner formulations with standard alkali blue types of toning additives. Such printed substrates and methods of printing utilizing such novel gravure toner additives are also encompassed within this invention.

BACKGROUND OF THE PRIOR ART

All U.S. and foreign patents cited within this specification are hereby incorporated by reference.

The nature of the gravure process imposes certain fundamental requirements on the chemical, physical and strength characteristics of the required inks. Toners are necessary to provide jet black appearances of inks containing standard black pigments, such as, carbon black, as one prominent example. Such a toner must be compatible in gravure ink vehicles, must not alter the mobility, the low viscosity, and the fundamental fast drying properties of the ink necessary for the Gravure process. Currently, alkali blue, from BASF, known as Pigment 61 (Colour Index # 42765:1) is utilized as the most prevalent black pigment toner in such gravure ink operations. Unfortunately, although such a toner meets the required solubility properties, the toning effects provided thereby simultaneously are less than satisfactory due to an excessive reddening and/or bronzing of the black printed image. An improved toner reducing such unwanted effects is thus highly desired within the black Gravure ink industry and market. To date, there are no teachings or fair suggestions of such needed improvements provided by and within the pigment for gravure ink prior art. It is believed that certain chromophores with an appropriate pendant group system may not only provide such desired solvent (toluene, ketones, etc) solubility, but may also provide effective toning with low-reddening and low-bronzing levels within such black gravure inks.

U.S. Pat. No. 4,383,865, to Iyengar, discloses a process for preparing a soft textured, high strength Alkali Blue pigment composition which comprises insolubilized amines. This composition is made by mixing a solution of alkali blue crude first with an alkaline solution of an alkyl aryl sulfonic acid, then with an acidic solution having from 3 to 36 carbon atoms, following which the pigment composition is recovered. In the '865 patent the preferred group of alkyl aryl sulfonic acids has from 1 to 14 carbon atoms. The most preferred alkyl aryl sulfonic acid appears to be dodecylbenzene sulfonic acid.

The closest related art of which applicants are aware includes the following U.S. Pat. Nos. 5,026,627; 4,456,485; 4,383,865; 4,032,357. U.S. Pat. No. 5,026,627 discloses a particular combination of surfactants, when incorporated with an Alkali Blue Pigment 61, produce a pigment product having the desirable characteristic of exhibiting high strength when used in either water flexo or oil ink end uses. The surfactants utilized are (1) di- and tri- decyl phosphate esters of free acids, together with (2) dehydroabietyl amine. U.S. Pat. No. 4,456,485, to Iyengar, discloses a process for preparing easily dispersible high color strength powdered alkali blue pigments by precipitating the pigment in the presence of various acids and/or amines, and/or esters, and/or alcohols, etc., as well as the product of these processes.

U.S. Pat. No. 4,032,357, assigned to Sherwin-Williams Company, disclosees a substantially anhydrous, free-flowing alkali blue pigment composition having an organic anionic dispersant coprecipitated therewith. Furthermore, the pigment and dispersant are admixed with an oil phase in order to reduce the hydrophilic aggregation of the coprecipitated pigment and dispersant. The specific organic dispersants used in the '357 patent are Gafac.RTM. RS-710 and Gafac.RTM. RS-610.

A colorant compound having polymer or pre-polymer substituent groups may be synthesized by the reaction of a colorant and a polyisocyanate as disclosed in Cross et al., U.S. Pat. No. 4,284,729; Krutak et al., U.S. Pat. No. 5,194,463; and Beckmann et al., U.S. Pat. No. 5,616,678.

U.S. Pat. No. 5,026,627 disclose a particular combination of surfactants when incorporated with an alkali blue pigment, produce a pigment toner exhibiting high strength when used in toluene-based inks (as one example of gravure types). While the pigment is widely used throughout the industry, they have serious drawbacks (as discussed above) in that they are difficult to handle, they are not conducive to post addition, provide a reddish tone to carbon black and causes bronzing of the printed image.

OBJECTS AND SUMMARY OF THE INVENTION

Therefore, one of the objects of the invention is to provide a toluene-soluble colorant. Another object of the invention is to provide a colorant that can be used as a toner for toluene-based (gravure) inks. Yet another object of the invention is to provide a colorant that can tone carbon black based inks to give a jet-black image without an appreciable degree of noticeable reddening and/or bronzing. Still another object of the invention is to provide a colorant that can tone carbon black based inks to give a glossier image. Yet another object of the invention is to provide a colorant that can tone carbon black based inks to give an image with substantially reduced bronzing. Yet another object of the invention is to provide a colorant that can tone carbon black based inks and that is easy to handle. Yet another object of the invention is to provide a colorant that can tone carbon black-based gravure inks at any stage of the ink manufacturing process.

It is thus a further object of the invention to provide a colorant with an ability to tone shades of toluene-based (gravure) inks. The colorants according to the invention are notable for very wide compatibility with the binder and printing ink systems customary for printing processes, such as Gravure, in single-color or multi-color printing. They are, for example, easily incorporated in binder systems for toluene-based inks. The printing inks with the colorants according to the invention are satisfactorily printable and produce strong bright prints. The colorants according to the invention are also suitable for mixing with carbon black in order to produce printing inks that; upon printing, produce an excellent brightening and jetting effect on the target substrate. The colorants are also suitable for producing printing inks for copy papers and ink ribbons, and as coloring agents in toners for electrophotographic printing.

Accordingly, then, this invention encompasses a gravure ink solution comprising at least one polymeric colorant toner component, at least one coloring component selected from the group consisting of at least one pigment, at least one dyestuff, and a mixture of both, at least one solvent, and at least one resin component. Also encompassed within this invention is black gravure ink composition comprising at least one coloring agent selected from the group consisting of at least one black pigment, at least one black dyestuff, and a mixture of both, at least one solvent, at least one resin, and at least one toner component, wherein, when measured under CIELAB and CMC standards, and at a brightness level (L*) of at least 26, said ink exhibits a hue angle (h) of at most 42. Additionally encompassed within this invention is black gravure ink composition comprising at least one coloring agent selected from the group consisting of at least one black pigment, at least one black dyestuff, and a mixture of both, at least one solvent, at least one resin, and at least one toner component, wherein when measured under CIELAB (and/or CMC) standards, and at a brightness level (L*) of at least 26, said ink exhibits an a* level of at most 1.4, a b* level of at most 0.7, and a hue angle (h) of at most 50. Also encompassed within this invention are methods of printing utilizing such ink solutions and the actual printed substrates (including, without limitation, paper, cardboard, paperboard, and other like cellulosic- or synthetic-based substrates, films and other plastic substrates, and textiles, such as fabrics made from natural fibers, such as cotton, linen, ramie, and the like, synthetic fibers, such as polyester, polyamide, polyaramid, and the like, and inorganic fibers, such as fiberglass, boron-derived fibers, glass, and the like, and blends of such fiber types) produced therefrom and therewith.

Without limiting the scope of the invention, the preferred features of the invention are hereinafter set forth. The ink compositions of the present invention are toluene solutions of one or more colorants.

It is an advantage of the present invention that the colorants can be used to tone shades of toluene based inks to obtain desired look of the printed image. It is also an advantage of the present invention that the colorants can be added to the toluene-based inks at any stage during the manufacture or use of the inks. It is another advantage of the present invention that the colorants can be used in combination with other toluene based ink carrier materials to obtain ink compositions that possess excellent spectral strengths. It is still another advantage of the present invention that the colorants are substantially transparent. It is yet another advantage of the present invention that the colorants can be used to tone carbon black based inks to provide jet blacks. It is yet another advantage of the present invention that the colorants are easy to handle in production.

The standard alkali blue pigment used in the industry tones the carbon black based toluene ink providing a reddish tone (higher 'a' values), and a bronzing effect on the printed image. Furthermore, the alkali blue pigment is very difficult to handle in production and can be added to the carbon black based inks only during the manufacture of the inks. The inventive colorants therefore provide clear distinct advantages over the alkali blue and other blue and magenta pigments used.

The particular toning components utilized within these inventive gravure ink compositions are polymeric (e.g., polyoxyalkenylated) colorants that exhibit $\lambda_{max}$ absorption measurements between about 550 and 610 nm (wavelengths), most preferably wavelengths between about 560 and 580 nm. Furthermore, such polymeric colorants must include nonionic chromophores as the coloring portion of the colorant itself. Thus, azos, anthraquinones, indigoids, benzodifuranones, and the like, may be utilized as the chromophoric component of the desired polymeric colorant. Such a selection criteria is significantly better for gravure ink compositions because such inks require the utilization of non-polar solvents therein. The presence of less compatible ionic (cationic, anionic, for example) chromophores affects the toning of the colorant within the gravure ink composition. Thus, chromophores of triphenylmethanes and other ionic species are significantly less effective as toners for gravure inks.

It has also been determined that the polyoxyalkylene chains of such a particular polymeric colorant must comprise at least a majority of propylene oxide in order to provide the necessary level of solvent solubility for proper stability and compatibility within gravure inks (such as within toluene as the primary non-limiting example). In general, as discussed in such prior art references as U.S. Pat Nos. 4,812,141 to Baumgartner et al., 5,176,745 to Moore et al., and 5,310,887 to Moore et al., polyoxyalkylene chains of polymeric colorants comprise alkylene oxide monomers, such as ethylene oxide, propylene oxide, butylene oxide, and higher carbon chain lengths, as well as possibly glycerol, glyceryl, and other like moieties. The particular limitation found to be important for these toner polymeric colorants is the amount of propylene oxide (or other bulkier oxides, such as butylene oxide or glycerol) must be greater than that for any ethylene oxides present. Thus, polyoxyalkylene chains of all propylene oxide, or all such $C_3$ and higher alkylene oxides is possible; however, more preferable is a range of ratios of ethylene oxide to such $C_3$ or higher alkylene oxides of from about 1:1.4 to about 1:4; more preferably from about 1:1.4 to about 1:3; and most preferably from about 1:1.4 to about 1:2; with, as noted above, propylene oxide the most preferred $C_3$ or higher alkylene oxide monomer present therein.

Thus, the determination of a proper toner component for this purpose is rather difficult; triphenylmethanes are highly prevalent within the coloring industry as providing the desired range of color in terms of $\lambda_{max}$ absorption measurements. However, again, use of such a chromophore has compatibility concerns and problems. In addition, the selection of a proper toner in terms of solvent solubility as well as proper colorimetric values (e.g., CIELAB measurements for a*, b*, h*, and L*, as discussed in greater detail below) in order to provide the desire jet black, low redness, and low bronzing effects within the target drawn down ink has been reduced to the aforementioned polymeric colorants. In particular, it has been found that polymeric colorants such as MILLIJET® Violet X80 (an azo-based polymeric colorant, available from Milliken & Company) and other like nonionic chromophore-based polymeric colorants exhibiting $\lambda_{max}$ imp absorption measurements between the necessary wavelengths as noted above, are proper for this invention. Without being bound to any specific scientific theory, it is believed that such types of polymeric colorants provide the desired effects due to the proper violet or blue hue needed to eliminate or reduce the undesired brown undertone by altering the shade to lower b* values (less blue) as well as the superior compatibility due to the nonionic nature of the chromophore further enhanced and the resultant solvent solubility provided by the presence of such polypxyalkylene chains.

Such gravure inks typically comprise (all in terms of weight percent within the total formulation) from 4–12% of a pigment and/or dyestuff (most prevalently carbon black or furnace black), from 0–8% of an extender pigment (such as alumina, calcium carbonate, and china clay), from 10 to 30% of a resin component (such as, most commonly modified resins, such as cellulose, polyamides, acrylic, vinyl, and/or hydrocarbon soluble resins), from 40 to 60% of a solvent (such as, most commonly toluene, while others, such as ketones, like methyl ethyl ketone, alcohols, like isopropyl alcohol, and esters, like ethyl acetate, as examples), and other additives, such as plasticizers, waxes and other types of like components, in amounts of from 2 to 10%.

The amount of toner component present within the inventive ink is from 0.01 to 50 parts per 100 parts of the total composition. Preferably, this amount is from 1 to 20 parts, more preferably from 2 to 15 parts, and most preferably from about 5 to about 10 parts. Surprisingly, it has been realized that higher concentrations (5 parts and higher, more particularly, above 6 parts) provide vast, unexpected improvements in measured hue angle and blueness of the sample inventive ink compositions. As noted below in greater detail, the blueness and corresponding hue angle are desirous and are surprisingly attained through the utilization of the inventive or otherwise selected toner components.

Of great importance to this invention, as well as any ink composition, is the ability for such a composition to provide desirable color, in terms of hue as well as visual effect. Visual color perception is based not in terms of red/green, yellow/blue, or other grouping of colors, but in terms of saturation (otherwise known as chroma) and hue. A numerical system of color differences is calculated in terms that agree with actual visual perception. Thus, to properly define or designate a particular label to a viewed color sample through analysis in a manner other than empirically, a measurement must be made of the distances between a sample color and a standard in the same values. Chroma is the amount of pure color contained in the sample, and is graphically measured (in CIELAB and/or CMC terms) as the distance from the center of the a* and b* axis for the sample. Brightness is a measurement of such a value for the particular sample of color. Hue angle is a measurement in terms of chroma as it is perceived by the viewer. A color difference between two distinct point on the axis can thus be described as the difference in each points' brightness (L*) value, the difference in their chroma (c*) value, and the difference in their hue angle (h*). Hue is measured in degrees from 0 to 360 (or a correlated negative angle on a Cartesian graph), where red is represented at the 0 angle, yellow at 90, green at 270 (or −90, for example), and blue at 360. The hue attribute of visual sensation has given rise to the color names (e.g., blue, green, yellow, red, etc.). Hue differences then depend primarily on variations in the wavelength of light reaching the eye at a particular angle from the viewed sample. Such a measurement (hue angle) is thus one of the three standard elements of color appearance (with the other two being brightness and saturation, or chroma, as noted above). Its calorimetric equivalent is dominant wavelength and, in terms of this invention, is of utmost importance, particularly for black offset inks, in providing a more effective, jetter, less red, less bronze, black ink. The target of this invention is thus to provide a hue angle closer to that of a typical blue measurement within the inventive ink after being drawn down on a surface. A hue angle measurement closer to the blue angle, or alternatively, further from the typical red angle, is thus the unexpected beneficial characteristic of these inventive inks, particularly as compared with the inks of the prior art comprising the state of the art in toning components (alkali blue pigment 61, etc., as discussed above).

DESCRIPTION OF THE PREFERRED EMBODIMENT

Without limiting the scope of the invention, the preferred features of the invention are hereinafter set forth.

EXAMPLE 1

Toluene-based inks 15 parts of a polymeric violet colorant, oxirane, methyl-, polymer with oxirane, ether (ethoxylated ~2–10 moles, propoxylated ~4–14 moles) with 2,2'-((3-methyl-4-)(2-amino-4methyl-3,5-diyanothiophenc)azo-phenyi-imino-bis ethanol (2:1), having a Color Value of 28, were mixed with 280 parts of Coated varnish (Resin No. 0180285) from Flint Ink, and 120 parts of toluene. The product was completely compatible. The final mixture was used as an ink and drawn down on paper. The image on paper is a brilliant violet and indicated that the individual components of the ink were completely compatible.

EXAMPLE 2

Toluene-Based inks 15 parts of the same polymeric violet colorant from EXAMPLE 1 were mixed with 280 parts of Coated varnish (Resin No 0180285) from Flint Ink, 120 parts of Toluene and 285 parts of a Black Concentrate (Flint Ink No 8040460). The product was allowed to mixed well and then drawn down on paper using a blade. The image was observed visually and measurements of l,a,b,c,h taken through analysis with an UltraScan® XE spectrophotometer (from HuliterLab). The image empicially appears to be a jetter black.

EXAMPLE 3

Comparative Example 15 parts of the Alkali Blue flush FB4365 from CPS Inc. was mixed with 280 parts of Coated varnish (Resin No 0180285) from Flint Ink, 120 parts of Toluene and 285 parts of a Black Concentrate (Flint Ink No 8040460). The product was allowed to mix well and then drawn down on paper using a blade. The image was observed visually and measurements of l,a,b,c,h taken. The image empirically appears to be a redder black as compared with EXAMPLE 2, above.

EXAMPLE 4

Comparative Example 15 parts of Ink Blue 452 from Milliken Chemical was mixed with 280 parts of Coated varnish (Resin No 0180285) from Flint Ink, 120 parts of Toluene and 285 parts of a Black Concentrate (Flint Ink No 8040460). The product was allowed to mix well and then drawn down on paper using a blade. The image was observed visually and measurements of l,a,b,c,h taken. The image empirically appears to be a redder black as compared with EXAMPLE 2. above.

TABLE

Chromatic Properties of Inventive and Comparative Examples

| # | Chromophore | Loading | L | A | B | C | h |
|---|---|---|---|---|---|---|---|
| 1 | Control - untoned | 0% | 26.48 | 0.43 | 0.73 | 0.85 | 59.41 |
| 2 | (Example #3) | 5% | 27.35 | 0.99 | 0.97 | 1.39 | 44.48 |
| 3 | (Example #4) | 5% | 27.14 | 0.81 | 0.77 | 1.12 | 43.27 |
| 4 | (Example #2) | 5% | 26.38 | 1.12 | 0.70 | 1.32 | 31.86 |

Thus, the incentive inks exhibited vastly improved and unexpectedly good measurements, particularly for hue angle, as compared with the standard alkali blue-containing inks.

There are, of course, many alternate embodiments and modifications of the present invention which are intended to be included within the spirit and scope of the following claims.

What I claim is:

1. A black gravure ink composition comprising at least one coloring agent selected from the group consisting of at least one black pigment, at least one black dyestuff, and a mixture of both, at least one solvent, at least one resin, and at least one toner component, wherein, when measured under CIELAB standards, and at a brightness level (L*) of at least 26, said ink exhibits a hue angle (h) of at most 42.

2. The ink composition of claim 1 wherein said ink exhibits a hue angle of at most 40.

3. The ink composition of claim 2 wherein said ink exhibits a hue angle of at most 36.

4. The ink composition of claim 3 wherein said ink exhibits a hue angle of at most 32.

5. A black gravure ink composition comprising at least one coloring agent selected from the group consisting of at least one black pigment, at least one black dyestuff, and a mixture of both, at least one solvent, at least one resin, and at least one toner component, wherein when measured under CIELAB standards, and at a brightness level (L*) of at least 26, said ink exhibits an a* level of at most 1.4, a b* level of at most 0.7, and a hue angle (h) of at most 50.

6. The ink composition of claim 5 wherein said ink exhibits a hue angle (h) of a most 42.

7. The ink composition of claim 6 wherein said ink exhibits a hue angle (h) of almost 40.

8. The ink composition of claim 7 wherein said ink exhibits a hue angle of at most 36.

* * * * *